United States Patent [19]
Campbell

[11] 3,821,648
[45] June 28, 1974

[54] AUTOMATIC NOISE FIGURE INDICATOR

[75] Inventor: Kenneth J. Campbell, Solana Beach, Calif.

[73] Assignee: The United States of America as represented by the Secretary of the Navy, Washington, D.C.

[22] Filed: May 29, 1973

[21] Appl. No.: 364,778

[52] U.S. Cl. .............................................. 325/363
[51] Int. Cl. .......................................... H04b 1/00
[58] Field of Search ........ 325/67, 65, 363, 364, 398

[56] References Cited
UNITED STATES PATENTS
3,072,845  1/1963  Bruck .............................. 325/363

Primary Examiner—Albert J. Mayer
Attorney, Agent, or Firm—R. S. Sciascia; G. J. Rubens; J. W. McLauren

[57] ABSTRACT

An automatic noise figure indicating system impresses noise of known amplitude on the RF input of a receiver under test and uses the audio output of the receiver to measure its noise figure. The injected noise is cyclically impressed upon the receiver at a determinable switching frequency, the output of the receiver being alternately connected to first and second low-pass filters in synchronism with the switching. A high-pass filter suppresses the switching frequency and prevents its detection in the noise figure indicating system. A means is provided for developing an analog signal as a function of the power ratio between the two signals produced by the first and second low-pass filters. The analog signal is visually presented by an indicator appropriately calibrated in terms of noise figure.

6 Claims, 2 Drawing Figures

AUTOMATIC NOISE FIGURE INDICATOR

BACKGROUND OF THE INVENTION

One prior art method of measuring the noise figure characteristics of a receiver is essentially a manually implemented procedure. Initially the noise output level of the receiver under test is measured; this is followed by the step of injecting a sufficient level of noise signal into the receiver antenna or RF input to increase the noise output level of the receiver by some arbitrary predetermined amount, usually in terms of decibels such as 3db, for example. The noise figure of the receiver under test may then be determined from a visual presentation such as a meter, the dial of which is appropriately calibrated in consideration of the fact that the noise output of the receiver is always increased by the same arbitrarily established predetermined amount, such as the 3db previously mentioned.

One of the prime disadvantages of this system and procedural technique is that the complete sequence of the previously outlined steps of measuring the initial receiver noise output level, adjusting the injected noise into the RF input of the receiver to produce a predetermined multiple output, etc. must be performed at each frequency to which the receiver may be tuned to check the noise figure at each such frequency. That is to say, that not infrequently the noise figure of a particular piece of equipment will be different for different frequencies and therefore in order to determine the noise figure of any particular receiver, and each of its operative frequencies, one must repeat all of the procedural steps and adjustments as previously outlined in the practice of the described prior art method and means of determining the noise figure of that equipment. As will be apparent to those skilled in the art, such procedure necessarily involves burdensome and time consuming repetition of steps and, moreover, depends heavily upon the repeated subjective determinations of the operator thereby increasing the possibility of introducing human error.

A second prior art method and means of determining the noise figure of a receiver is an automatic measurement in which a known and constant amount of noise is periodically injected into the receiver under test at its antenna or RF input. Two alternate conditions are thus established, one when the noise generator is off, and the other when the noise generator is on, producing two different amplitudes of outputs at the IF output of the receiver. Appropriate measuring circuitry is employed to determine the relative output amplitudes under the alternate conditions and the ratio of the two values, together with the fact that a known amount of noise was alternately injected into the receiver, enables the determination and calibration of the noise figure of the receiver under test. Although the latter prior art technique eliminates the necessity for manual adjustment which is the major drawback and disadvantage of the first described prior art method, the second method and equipment suffers from the disadvantage of being only capable of accurately determining the noise figure of a receiver between its RF input and its IF output.

The reason for this is the fact that the periodic injection of noise into the receiver under test introduces extraneous and unwanted signals as a function of the frequency with which the noise is alternately impressed upon and then removed from the input to the receiver under test.

Such extraneous and unwanted signals caused by the switching frequency will appear as a portion of the noise figure of the receiver under test if the audio portions of the receiver are included in the test. The switching frequencies are conventionally of a low audio frequency, such as 60Hz, and therefore it is the usual and customary practice in the employment of such prior art techniques and equipments to eliminate the switching frequency by taking the noise output from the IF output of the receiver under test.

While such tests are quite satisfactory within their limitations, they do not include any noise which is generated in any part of the receiver beyond its IF output and therefore the results which are obtained from such tests are not a wholly a true indication of the noise characteristics of the entirety of the receiver under test.

Accordingly, it is desirable that a method and system be devised for automatically measuring and indicating the noise figure of equipment such as receivers for accurately indicating the noise characteristics of such equipment in its entirety from its initial input, such as its antenna or RF input, to its ultimate and terminal output such as its audio output.

SUMMARY OF THE INVENTION

The present invention contemplates the automatic measurement and indication of the noise figure characteristics of a particular electronic equipment such as a receiver, for example. A source providing noise signals of known amplitude is alternately impressed upon and removed from the antenna or RF input of a receiver under test.

A high-pass filter is connectable to receive the signal developed at the audio output of the receiver under test. A detector is arranged to receive the signals which are passed by the highpass filter and produces output signals as a function of the instantaneous amplitude of its received signals. Such a detector may take the form essentially of a half-wave positive rectifier, for example.

First and second low-pass filters are provided which preferably have a relatively slow time constant so that they perform a type of integrating function.

An appropriate switch means which may preferably take the form of an electronically operated switching device, such as a suitable field effect transistor circuit, for example, is connected to the output of the detector; a source of cyclically repetitive signals of predetermined frequency is arranged and connected to operate the described switch means for connecting the output of the detector to the first low-pass filter during the period when the noise signal is not impressed upon the RF input of the receiver under test, and, alternately, for synchronously connecting the output from the detector to the second low-pass filter during the period when the noise signal is impressed upon the RF input of the receiver under test.

An appropriate means is provided to receive the two signals produced by the first and second low-pass filters, respectively, for developing an analog signal as a function of the power ratio between those two signals.

The analog signal thus derived is then used to generate a visual presentation of its amplitude on an appropriate indicator, such as a meter suitably calibrated in accordance with the preestablished and predetermined parameters of the system.

The system thus produces an automatic indication and visual presentation of the operative noise figure characteristics of a receiver under test, for example, including its entire operative components and circuits from its initial input to its ultimate output, as it is tuned through various frequencies included within its designed bandwidth.

Accordingly, it is a primary objective of the present invention to provide an improved automatic noise figure indicating system which obviates disadvantages of prior art systems.

Another most important object of the present invention is to provide such an automatic noise figure indicating system to measure and indicate the noise characteristics of equipments such as receivers from the antenna or RF input through the entire circuitry to and including the audio output terminal.

A further object of the present invention is to provide such an automatic noise figure indicating system which is readily adaptable to implementation through the use of solid state electronic elements and components.

Yet another important aspect and objective of the present invention is to provide such an automatic noise figure indicating system which is readily embodied in a small, compact, and entirely solid state configuration minimizing space requirements and providing a high degree of durability and reliability in operation.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
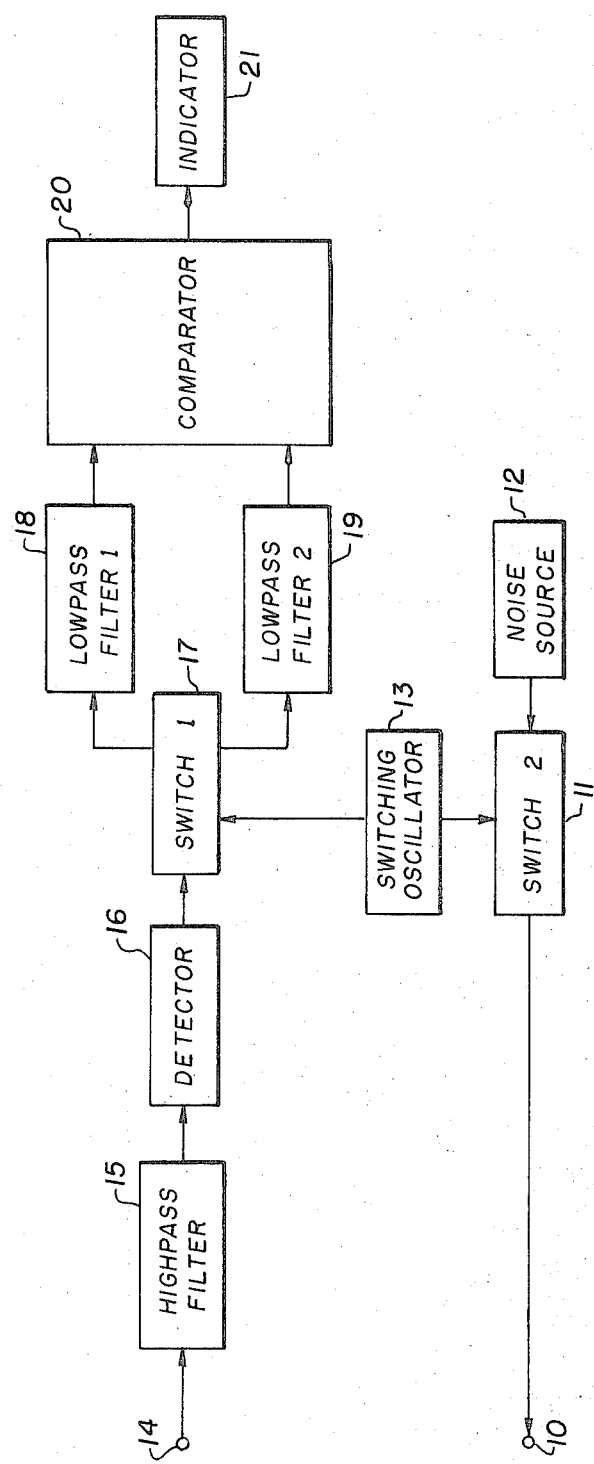
FIG. 1 is a schematic block diagram illustrating one preferred embodiment of the present invention; and, FIG. 2 is a schematic block diagram illustrating an alternative preferred embodiment of the present invention.

FIG. 1 illustrates a preferred embodiment of the present invention having a terminal 10 which is connectable to the RF input of a receiver or similar equipment under test. The terminal 10 is connected to a switch 11 which in turn receives an input from a noise source 12.

The switch 11 may preferably take an electronic form, such as a field effect transistor circuit, for example, which is capable of responding to the signals generated by a switching oscillator 13 so as to alternate between two switch conditions, one of which connects the noise source to the terminal 10, and the other condition which disconnects the noise source from the terminal 10.

The switching oscillator 13 is a source of cyclically repetitive signals of predetermined frequency which is also connected to synchronously operate another switch means of the embodiment in a manner which will be fully explained hereinafter.

A terminal 14 is provided in the embodiment of FIG. 1 to be connectable to the audio output terminal of a receiver or similar equipment under test. The terminal 14 is connected to a highpass filter 15 which in turn is connected to feed the signals it passes to a detector 16 which may take the form of a half-wave positive rectifier, for example.

The output of detector 16 is connected as the input to a switch 17 which may be identical or similar to the switch 11, previously described. Both switches 11 and 17 are connected to the output of the switching oscillator 13, causing them to operate in synchronism. Switch 17 provides cyclically alternating first and second outputs which are connected as inputs to a first low-pass filter 18 and a second low-pass filter 19, respectively.

The two outputs produced by the first low-pass filter 18 and the second low-pass filter 19 are connected as the inputs to a comparator 20 and the output of the comparator 20 provides the input to an indicator 21.

In operation, the embodiment illustrated by schematic block diagram of FIG. 1 functions so as to provide a noise signal of known amplitude which is alternately connected to and disconnected from terminal 10. This operation is produced by the noise source 12 being alternately connected and disconnected relative to the terminal 10 through the operation of the switch 11 which is under the control of the switching oscillator 13. Thus, a noise signal appears at terminal 10 which is of known amplitude and also is being cyclically switched on and switched off.

The output from the receiver under test, which is derived from its audio output terminal, is connected to terminal 14 of the embodiment illustrated in FIG. 1 and comprises alternate signals. One of the noise signals constitutes that noise which is inherently generated within the receiver itself from its RF or antenna input to its audio output and alternately (due to the cyclic switching of the noise source) a signal realized at terminal 14 which is comprised of both the inherent noise generated within the receiver itself and in addition, the injected noise signal of known amplitude derived from the noise source 12.

The high-pass filter 15 operates upon the received signals to pass all signals except those having relatively low frequencies which are due to the switching frequency generated by the switching oscillator 13. Signals within the bandpass of high-pass filter 15 are fed as the input to the detector 16 which may, for example, take the form of a half-wave positive rectifier.

The purpose of the detector 16 is to generate an output signal which approximates the RMS value of its received signals and for most practical applications of the present invention it has been found that, because of the random nature of noise, a positive half-wave rectification furnishes an average type output signal which approximates the desired RMS value to a close enough degree for most usages.

The switch 17 receives the output signals of detector 16 and alternately switches those signals between the first low-pass filter 18 and the second low-pass filter 19. Since the switch 17 is operated in synchronism with the switch 11, the result is a synchronous operation in which the output of the detector 16 is connected to the first low-pass filter 18 during the time period when the noise signal generated by the noise source 12 is not impressed upon the receiver through terminal connection 10, and the output of the detector 16 is connected to the second low-pass filter 19 during the period of time when the noise signal derived from the noise source 12 is impressed upon the RF input of the receiver under test through the terminal 10.

The first and second low-pass filters 18 and 19 are designed to have relatively slow time constants so that they essentially perform integrating functions to produce continuous outputs, one of which is representative of the noise developed inherently by the receiver only, and the other of which is representative of the inherent noise of the receiver together with that noise which is generated by the noise source and is of known amplitude.

The two continuous outputs are received in a comparator circuit 20 which performs the function of developing an analog signal as a function of the power ratio between its two received signals. Since the two received signals are integrated and continuous signals, the comparator 20 produces a continuous output which is an analog function of the power ratio between the two signals.

The output of the comparator 20 which is in the form of an analog signal is connected as the input to a suitable indicator 21 which may take the form of a meter, for example, calibrated in terms of db to indicate the noise figure of the receiver under test.

It will be apparent to those skilled and knowledgeable in the pertinent arts that the high-pass filter 15 as conceived and included in the operative combination of elements comprising the present invention, eliminates those false noise signals of frequencies related to and due to the switching operation which are unwanted and undesirable, inasmuch as they do not constitute noise signals inherent in the operation of the equipment under test and thus may otherwise contribute inaccuracy and unreliability in noise measurements.

In the prior art systems such false and unwanted signals were customarily eliminated by testing only from the RF input to the IF output of the receiver under test. However, it is readily apparent that such tests were not completely valid in the sense that they did not test the noise characteristics of the entire receiver, but only a portion of the receiver from the RF input to the IF output. By contrast the concept and teaching of the present invention advantageously enables the automatic testing of the entire receiver from its antenna RF input to its audio output.

Moreover, these desirable characteristics and advantages are produced by the concept and embodiment of the present invention throughout the complete range of frequencies within the bandwidth of the receiver under test by merely tuning the receiver to produce a visual display of the noise figure which is developed for each particular frequency responsive to the tuning of the receiver.

Figure 2:
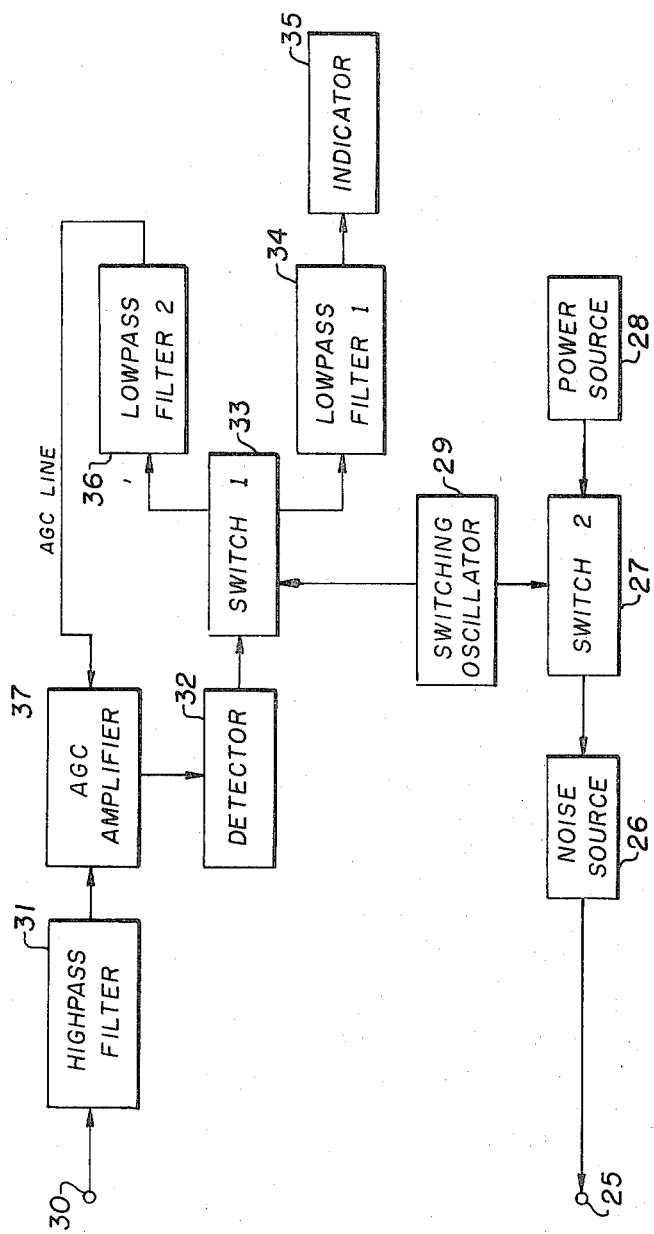

FIG. 2 illustrates an alternative form of preferred embodiment of the present invention. A terminal 25 is adapted to be connectable to the antenna or RF input of a receiver or comparable equipment under test and is connected to a noise source 26 capable, upon actuation, of producing a noise signal of known and predetermined amplitude. A switch 27 is connected between the noise source 26 and a suitable power source 28 so as to control the actuation of noise source 26, and thereby control its output. The switch 27 may be a solid state electronic device such as a field effect transistor circuit for example, operative under the control of a switching oscillator 29 which provides a source of cyclically repetitive signals of a predetermined frequency to operate the switch 27 in synchronism with another switch included in the system as will be described hereinafter.

An input terminal 30 is adaptable to receive an input signal to the system from the audio output terminal of a receiver under test, for example, and the noise signals which it receives are fed to a high-pass filter 31 which is operative essentially in the same manner as the high-pass filter 15 as illustrated in the embodiment of FIG. 1.

A detector 32 which is operative essentially in the same manner of the detector 16 shown in the embodiment illustrated in FIG. 1, is connected to a switch means 33 actuated by the switching oscillator 29 in synchronism with the switch 27 so as to connect the output of the detector 32 to a first low-pass filter 34 when the noise signal derived from the noise source 26 is not actuated and therefore not impressed on the receiver under test, and, alternately, to connect the output of the detector 32 to a second low-pass filter 36 during that period of time when the switch 27 is operative to connect the power source to actuate the noise source 26 and therefore impress the noise signal of known amplitude upon the RF or antenna input to the receiver under test.

An indicator 35 receives the output of the low-pass filter 34 which is indicative of the power ratio between the two signals developed by the respective low-pass filters 34 and 36 and therefore is a measure of the noise figure characteristic of the receiver under test.

It will be noted, however, that no comparator circuit such as that employed in the embodiment of FIG. 1 is used in the embodiment of FIG. 2. Instead, alternate means for developing analog signal as a function of the power ratio between the two signals produced by the first and second low-pass filters 34 and 36 is employed. Such means comprises an automatic gain control circuit 37 which develops a gain control signal from the output of low-pass filter 36, and is connected between the high-pass filter 31 and the detector 32.

It will be recalled that the output of low-pass filter 34 is a function of the noise inherently developed in the receiver itself, while the output of the second low-pass filter 36 is a function of both that noise inherently developed by the receiver itself, and in addition the noise of known amplitude derived from the noise source 26 which is cyclically impressed upon the input of the receiver under test.

The AGC amplifier 37 will operate so as to maintain a constant level of output signal regardless of the amplitude of its input signal and has a gain response which carries over from one cyclic interval to the next while the noise source 26 is being alternately impressed upon and removed from the input to the receiver under test.

Bearing in mind that the noise input derived from the noise source 26 and cyclically impressed upon the receiver under test is of a known and fixed amplitude, it will be apparent that when the noise inherently developed within the receiver itself increased, the low-pass filter 36 will develop a gain control signal to be fed to the AGC amplifier 37 to decrease its gain.

However, such decrease in gain will not be inversely proportional to the increase in inherent noise. This is so because during the period when the gain control signal is developed by the low-pass filter 36, it is generating an output which is responsive to both the inherent noise signal and the injected noise of fixed amplitude derived from the noise source 26; therefore, the overall effect is that the combination of an increase in the amplitude of the inherently developed noise by itself, as amplified by the newly derived, partially diminished, gain control signal impressed upon the AGC amplifier 36, is an overall increase in the amplitude signal fed to the first low-pass filter 34.

This operation can be demonstrated as for instance, in a case where initially the inherent noise is equal to the fixed amplitude of injected noise and subsequently the inherent noise of the receiver increases by a factor of two. Recalling that the total signal output of the automatic gain control circuit representative of both the inherent noise of the receiver, and the noise signal of fixed amplitude introduced from the noise source, will always tend to be a constant because of the automatic gain control, a two-fold increase in the inherent noise of the receiver will reduce the amplification factor to two-thirds of its previous value. However, since the inherent noise was doubled, the total result is that the output signal to the first low-pass filter 34, and therefore to the indicator 35, is one and one-third times what it has been previously, i.e., 2 × ⅔, or 4/3. This relationship is demonstrated from the equations below where $V_{on}$ is the output signal developed by the AGC amplifier 37 when the noise signal is impressed upon the receiver under test, $V_{off}$ is the output signal developed by the AGC amplifier 37 when no external noise signal is impressed upon the receiver under test, A is the initial amplification factor, $A_1$ is the subsequent amplification of the AGC amplifier 37 when the inherent noise of the receiver under test has increased by the factor of two, and N represents the noise signals.

$V_{on} = K = A(½N + ½N) = A_1(½N + N)$
$A_1 = AN/3/2N = ⅔A$
$V_{off} = A½N = AN/2$
$V_{off_2} = A_1(N) = ⅔AN = 2AN/3$ therefore the ratio of $V_{off}$ to $V_{off_2}$ is:
$V_{off}/V_{off_1} = AN/2/2AN/3 = 1/1⅓$ or,
$V_{off_1} = 1⅓$ times $V_{off}$ Thus, it may be seen that the indicator of the embodiment of of the present invention illustrated in FIG. 2 may be calibrated in terms of noise figures, such as db, for instance, to respond to its received signals for directly indicating the instantaneous noise figure of the receiver under test at any selected frequency within its bandwidth of operation.

Those skilled and knowledgeable in the pertinent arts will appreciate that the present invention while obviating several more troublesome disadvantages of prior art systems, also offers the highly desirable attributes of lending itself readily to implementation in solid state electronic form, resulting in more compact packaging, and greater durability, as well as a higher degree of reliability in operation.

Moreover, the concept and operation of the present invention in use is such that the entire system of the receiver under test, from the antenna or RF input to the audio output, is accurately and reliably tested producing a true noise figure of the entire equipment, at each selected frequency to which the receiver is tuned.

The undesirable false noise signals generated by the switching operation are filtered out by the high-pass filter and thus makes it possible to test the operation of all sections of the receiver under test including the detector and post detection amplifiers. This a significant advantage of the present invention since its test indication by reason of its unique concept and operation provides accurate noise figures over a complete range of operative frequencies and for the entire equipment, rather than just a portion of the equipment as was either necessary or true of many prior art concepts.

Obviously many modifications and variations of the present invention are possible in the light of the above teachings. It is therefore to be understood that within the scope of the appended claims the invention may be practiced otherwise than as specifically described.

What is claimed is:

1. An automatic noise figure indicating system comprising:
    a source for producing a noise signal of known amplitude connectable to the RF input of a receiver under test;
    a high-pass filter connectable to receive the audio output of said receiver under test;
    a detector for receiving signals passed by said high-pass filter, and producing output signals as a function of the instantaneous amplitude of its received signals;
    first and second low-pass filters;
    first switch means connected to said detector;
    second switch means operatively connected for impressing said noise signal upon the RF input to said receiver under test;
    a source of cyclically repetitive signals of predetermined frequency to synchronously operate said first and second switch means for connecting the output of said detector to said first low-pass filter when said noise signal is not impressed upon the RF input of said receiver under test, and for connecting the output of said detector to said second low-pass filter when said noise signal is impressed upon the RF input of said receiver under test;
    means for developing an analog signal as a function of the power ratio between the two signals produced by said first and second low-pass filters; and
    an indicator for producing a visual presentation of the amplitude of said analog signal.

2. An automatic noise figure indicating system as claimed in claim 1 wherein said means for developing said analog signal comprises an automatic gain control circuit connected between said high-pass filter and said detector and developing its gain control in response to the output of said second low-pass filter.

3. An automatic noise figure indicating system as claimed in claim 1 wherein said means for developing said analog signal comprises a comparator circuit connected to receive the output signals of said first and second low-pass filters for generating an analog signal as a function of the power ratio between said two signals.

4. An automatic noise figure indicating system as claimed in claim 1 wherein said first and second switch means comprise electronically operated solid state devices.

5. An automatic noise figure indicating system as claimed in claim 4 wherein said electronically operated solid state devices are field effect transistors.

6. An automatic noise figure indicating system as claimed in claim 1 wherein said source for producing a noise signal is a noise diode.

* * * * *